United States Patent
Otani (10) Patent No.: US 10,690,931 B2
(45) Date of Patent: Jun. 23, 2020

(54) LIGHT SOURCE DEVICE AND PROJECTION DISPLAY APPARATUS

(71) Applicant: Panasonic Intellectual Property Management Co., Ltd., Osaka (JP)

(72) Inventor: Sosuke Otani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/406,079

(22) Filed: May 8, 2019

(65) Prior Publication Data
US 2019/0361255 A1 Nov. 28, 2019

(30) Foreign Application Priority Data

May 25, 2018 (JP) .................................. 2018-100092
Mar. 6, 2019 (JP) .................................. 2019-040316

(51) Int. Cl.
*G02B 27/28* (2006.01)
*G03B 21/20* (2006.01)

(52) U.S. Cl.
CPC ......... *G02B 27/286* (2013.01); *G02B 27/283* (2013.01); *G03B 21/204* (2013.01); *G03B 21/2013* (2013.01); *G03B 21/2073* (2013.01)

(58) Field of Classification Search
CPC .............. G02B 27/286; G02B 27/283; G03B 21/2013; G03B 21/204; G03B 21/2073
USPC .......................................................... 362/19
See application file for complete search history.

(56) References Cited

U.S. PATENT DOCUMENTS

| 5,036,512 A | * | 7/1991 | Cloonan | G02B 27/283 398/65 |
| 6,486,997 B1 | * | 11/2002 | Bruzzone | G02B 5/305 359/247 |
| 2007/0024809 A1 | * | 2/2007 | Takahashi | G03B 21/14 353/20 |
| 2008/0231953 A1 | * | 9/2008 | Young | G02B 27/286 359/489.08 |

(Continued)

FOREIGN PATENT DOCUMENTS

| JP | 2008-003125 | 1/2008 |
| JP | 2009-213000 | 9/2009 |

(Continued)

*Primary Examiner* — Bryon T Gyllstrom
(74) *Attorney, Agent, or Firm* — Wenderoth, Lind & Ponack, L.L.P.

(57) ABSTRACT

A light source device includes first and second light source units, a first polarization beam splitter, and a polarization conversion element. The first light source unit emits first linear polarization light in a first direction. The second light source unit is disposed facing the first light source unit, and emits the first linear polarization light in a second direction opposite to the first direction. The first linear polarization light emitted from the first light source unit is reflected by the first polarization beam splitter in a third direction perpendicular to the first and second directions. The first linear polarization light emitted from the second light source unit is reflected by the first polarization beam splitter in a fourth direction opposite to the third direction, is converted into the second linear polarization light by the polarization conversion element, and is reflected in the third direction.

5 Claims, 12 Drawing Sheets

(56) References Cited

U.S. PATENT DOCUMENTS

| | | | |
|---|---|---|---|
| 2009/0296008 A1* | 12/2009 | Kawamura | G02B 27/286 349/5 |
| 2009/0310042 A1* | 12/2009 | Vidal | G02B 27/283 349/8 |
| 2010/0128186 A1* | 5/2010 | Togashi | G02B 5/32 349/9 |
| 2011/0043712 A1* | 2/2011 | Yamakawa | G03B 21/14 349/9 |
| 2012/0008098 A1* | 1/2012 | Akiyama | F21S 41/148 362/19 |
| 2013/0107223 A1* | 5/2013 | Toyooka | G03B 21/16 353/31 |

FOREIGN PATENT DOCUMENTS

| | | |
|---|---|---|
| JP | 2010-102049 | 5/2010 |
| JP | 2010-256494 | 11/2010 |
| JP | 2012-018208 | 1/2012 |

* cited by examiner

LIGHT SOURCE DEVICE AND PROJECTION DISPLAY APPARATUS

BACKGROUND

1. Technical Field

The present disclosure relates to a light source device that combines and emits light fluxes from a plurality of light source arrays (light source units), and a projection display apparatus using this light source device.

2. Description of the Related Art

Projectors are demanded to be miniaturized. For miniaturization, conceivable techniques include reducing a light flux diameter by narrowing a light-source interval to miniaturize an optical system at a subsequent stage, and combining light from a plurality of light sources with a reduced space. However, when the light-source interval is narrowed, cooling performance by a heat sink is lowered, thereby insufficiently radiating heat of the light sources. This may cause the light sources to be damaged. In a light ray composition method using a reflective member such as a mirror, with respect to one reflective member, only light rays from two directions can be combined, whereby a light ray composition unit is increased in size.

PTL1 (Unexamined Japanese Patent Publication No. 2010-102049) discloses an illumination device (light source device) for a projection display apparatus (projector). The illumination device disclosed in PTL1 includes first light source arrays that are arranged along a first direction parallel to a predetermined plane at predetermined intervals, and each emit light in an identical direction parallel to the predetermined plane, second light source arrays that are arranged along a second direction parallel to a predetermined plane at predetermined intervals, and each emit light in an identical direction crossing the light emitted from the first light source arrays, and a light ray composition member in which transmissive regions that transmit the light emitted from the first light source arrays and reflective regions that reflect the light emitted from the second light source arrays are alternately disposed. The light ray composition member is disposed such that the light emitted from the first light source arrays enters the transmissive regions, the light emitted from the second light source arrays enters the reflective regions, and the light emitted from the first light source arrays that has transmitted through the transmissive regions and the light emitted from the second light source arrays that has been reflected by the reflective regions advance in an identical direction.

SUMMARY

The present disclosure provides a light source device and a projection display apparatus that suitably combine light fluxes from a plurality of light source units, thereby achieving high intensity and downsizing.

A light source unit according to the present disclosure includes a first light source unit, a second light source unit, a first polarization beam splitter, and a polarization conversion element. The first light source unit emits first linear polarization light in a first direction. The second light source unit is disposed facing the first light source unit, and emits the first linear polarization light in a second direction opposite to the first direction. The first polarization beam splitter is disposed between the first light source unit and the second light source unit, reflects the first linear polarization light, and transmits second linear polarization light of which polarization direction is perpendicular to the first linear polarization light. The polarization conversion element is configured with a transparent substrate having one surface with a ¼ wavelength coat and another surface with a reflective coat. The first linear polarization light emitted from the first light source unit is reflected by the first polarization beam splitter in a third direction perpendicular to the first and second directions. The first linear polarization light emitted from the second light source unit is reflected by the first polarization beam splitter in a fourth direction opposite to the third direction, is converted into the second linear polarization light by the polarization conversion element, and is reflected in the third direction.

The light source device and the projection display apparatus according to the present disclosure combine light fluxes from a plurality of light source units, thereby achieving high intensity and downsizing.

DETAILED DESCRIPTION

Hereinafter, exemplary embodiments will be described in detail with reference to the drawings as appropriate. However, an unnecessarily detailed description will not be given in some cases. For example, a detailed description of a well-known matter and a duplicated description of substantially the same configuration will be omitted in some cases. This is to avoid the following description from being unnecessarily redundant and thus to help those skilled in the art to easily understand the description.

Here, the inventor of the present disclosure provides the accompanying drawings and the following description such that those skilled in the art can sufficiently understand the present disclosure, and therefore, does not intend to restrict the subject matters of claims by the accompanying drawings and the following description.

First Exemplary Embodiment

A first exemplary embodiment will now be described below with reference to FIGS. 1 to 6. A projector will be described below as a specific embodiment of a projection display apparatus according to the present disclosure.

[1-1. Configuration]

[1-1-1. Configuration of Projector]

Figure 1:
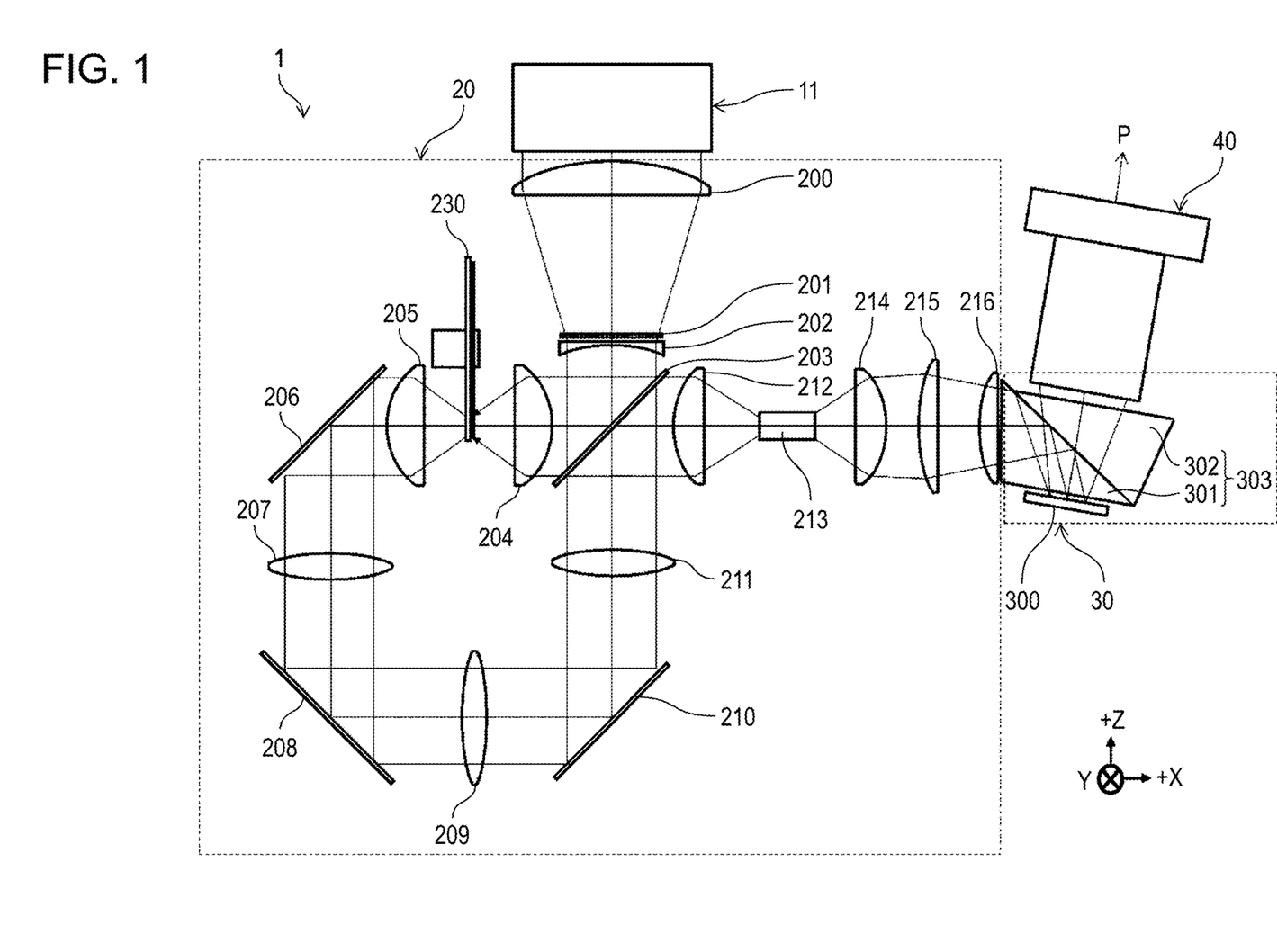
FIG. 1 is a diagram illustrating a configuration of a projector according to a first exemplary embodiment.

FIG. 1 illustrates a configuration of projector 1 according to a first exemplary embodiment. Projector 1 includes light source device 11, illumination optical system 20, image generator 30, and projection optical system 40. FIG. 1 indicates an XYZ orthogonal coordinate system, and FIG. 2 and subsequent figures also indicate the same XYZ orthogonal coordinate system as appropriate.

Projector 1 guides light emitted from light source device 11 to image generator 30 with illumination optical system 20, and generates image light by modulating the guided light according to an image signal from a controller using a digital micromirror device (hereinafter, referred to as a "DMD") in image generator 30. Projector 1 projects the generated image light onto, for example, a screen through projection optical system 40. Hereinafter, a configuration of each part will be described in detail.

Light source device 11 is configured with a plurality of semiconductor lasers, and generates light flux in which laser rays are two-dimensionally arrayed. Details of light source device 11 will be described later.

Illumination optical system 20 guides the light flux from light source device 11 to image generator 30. The light from light source device 11 is condensed by condenser lens 200, transmits through diffuser plate 201, and then is collimated by collimate lens 202. The collimated light is reflected by dichroic mirror 203 in a −X direction and is condensed on phosphor wheel device 230.

Diffuser plate 201 is a flat glass, and fine uneven shapes are formed on one or both surfaces of diffuser plate 201. Dichroic mirror 203 has a characteristic that reflects blue light and transmits light having a wavelength band other than the blue light.

Figure 2:
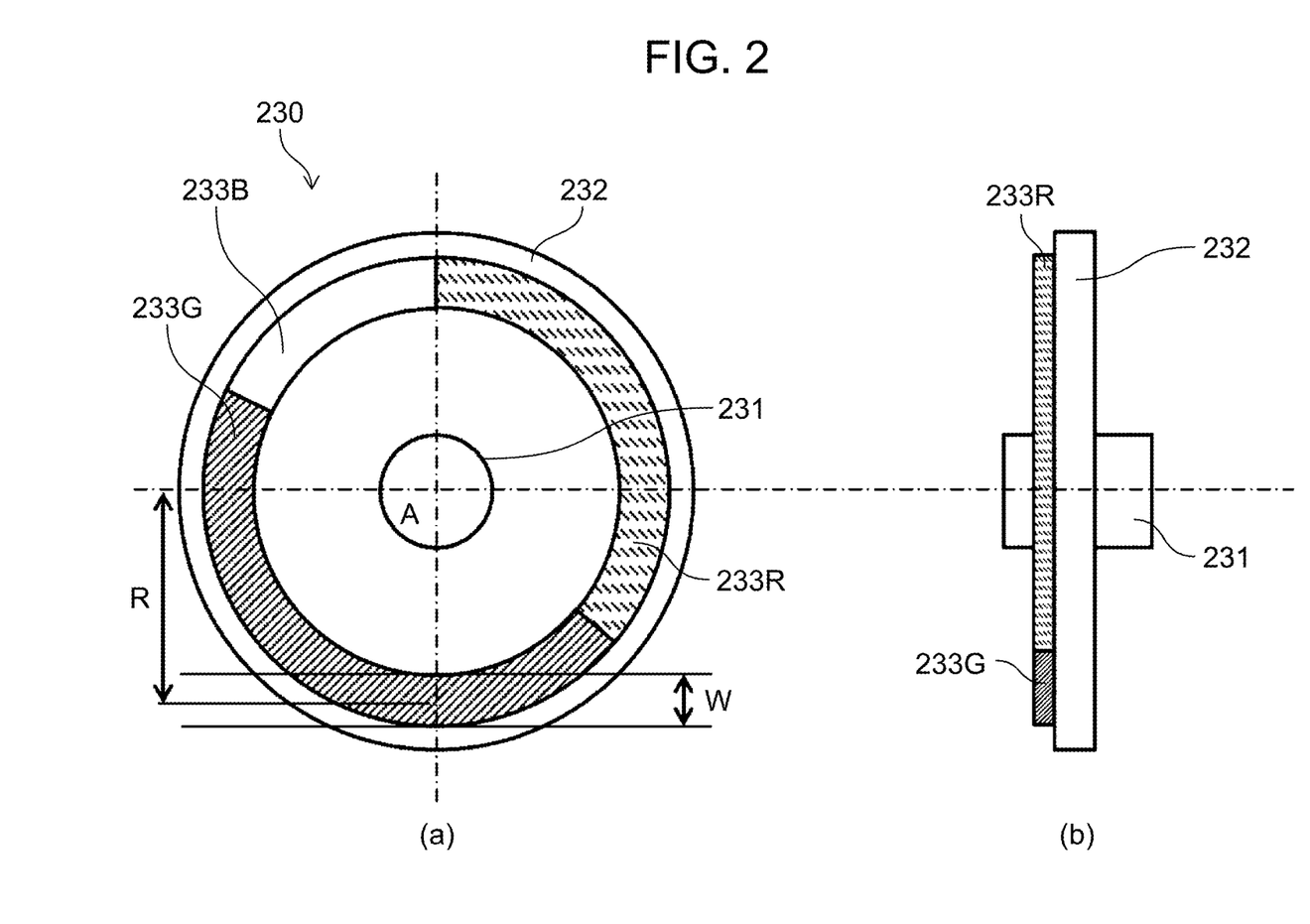
FIG. 2 is a diagram illustrating a phosphor wheel device in an illumination optical system according to the first exemplary embodiment.

As illustrated in a front view in part (a) of FIG. 2 and a side view in part (b) of FIG. 2, phosphor wheel device 230 is configured with motor 231 and rotary substrate 232 formed from a disk-shaped plate that is rotary driven around a rotation axis of motor 231. One surface of rotary substrate 232 is mirror finished. As illustrated in the front view in part (a) of FIG. 2, in the one surface, on a circumference separated from center A of the rotation axis of a phosphor wheel with distance R, red phosphor part 233R, green phosphor part 233G, and opening 233B are formed with predetermined width W inwardly and outwardly from this circumference.

When the laser light from light source device 11 is condensed on red phosphor part 233R of phosphor wheel device 230, a phosphor of red phosphor part 233R is excited to emit red light. When the laser light from light source device 11 is condensed on green phosphor part 233G of phosphor wheel device 230, a phosphor of green phosphor part 233G is excited to emit green light. Further, the laser light from light source device 11 condensed in opening 233B of phosphor wheel device 230 transmits through phosphor wheel device 230.

With reference back to FIG. 1, the red light and the green light obtained with phosphor wheel device 230 are emitted from phosphor wheel device 230 in a +X direction. Fluorescent light emitted from red phosphor part 233R and green phosphor part 233G in the −X direction is reflected on the one surface of rotary substrate 232 to be emitted in the +X direction. The red light and the green light are collimated by lens 204, transmit through dichroic mirror 203, are condensed by condenser lens 212, and enter rod integrator 213.

On the other hand, blue light of the blue semiconductor laser passing through opening 233B advances on a path formed by lens 205, mirror 206, lens 207, mirror 208, lens 209, mirror 210, and lens 211, is reflected by dichroic mirror 203, is condensed by condenser lens 212, and enters rod integrator 213. Lenses 207, 209, and 211 function as a relay lens.

Rod integrator 213 is a solid rod formed from a transparent member such as glass. Rod integrator 213 reflects incident light inside thereof a plurality of times, thereby generating light having a uniform light intensity distribution. Note that, rod integrator 213 may be a solid rod whose inner wall is configured with a mirror surface.

Light emitted from rod integrator 213 enters total internal reflection (TIR) prism 303 configured with a pair of prisms that are first prism 301 and second prism 302 through lens 214, lens 215, and lens 216. The entering light is modulated according to an image signal with DMD 300 serving as an optical modulator and is emitted as image light P. Lens 214, lens 215, and lens 216 configure a relay lens for substantially imaging the light emitted from rod integrator 213 on DMD 300 in image generator 30.

The light emitted from DMD 300 enters projection optical system 40. Projection optical system 40 projects the image light from image generator 30 onto a screen, for example. Projection optical system 40 includes a lens for adjusting focusing or zooming, for example.

[1-1-2. Configuration of Light Source Device]

Figure 3:
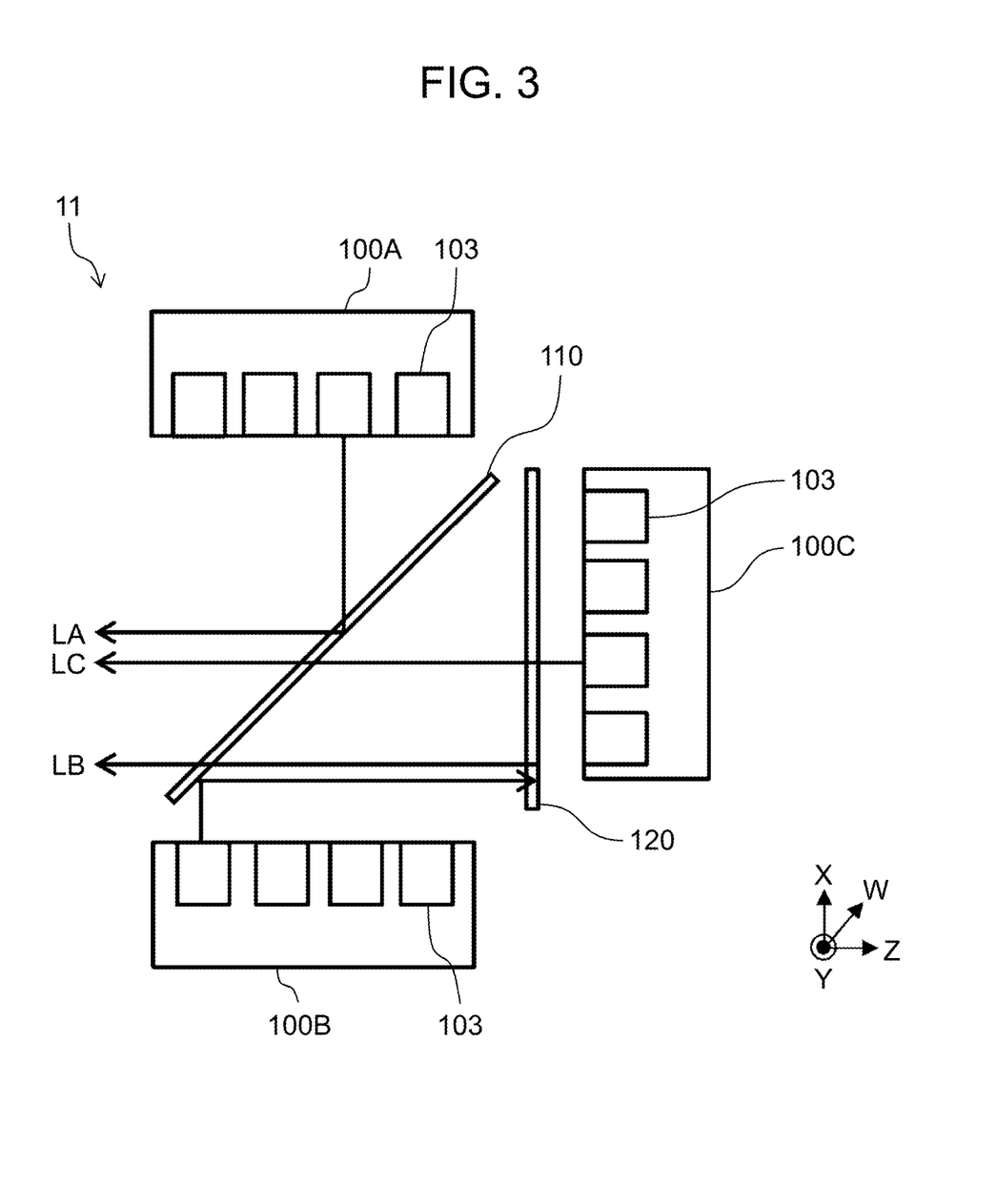
FIG. 3 is a diagram illustrating a configuration of a light source device according to the first exemplary embodiment.

Hereinafter, a configuration of light source device 11 will be described in detail with reference to FIGS. 3 to 5. FIG. 3 is a diagram illustrating the configuration of light source device 11 according to the first exemplary embodiment. In FIG. 3, optical paths are indicated with arrows. Also, in FIG. 3, a direction forming an angle of 45 degrees with respect to the X direction and the Z direction is indicated as a W direction. Light source device 11 includes first light source unit 100A, second light source unit 100B, third light source unit 100C, polarization beam splitter 110, and polarization conversion element 120.

Figure 4:
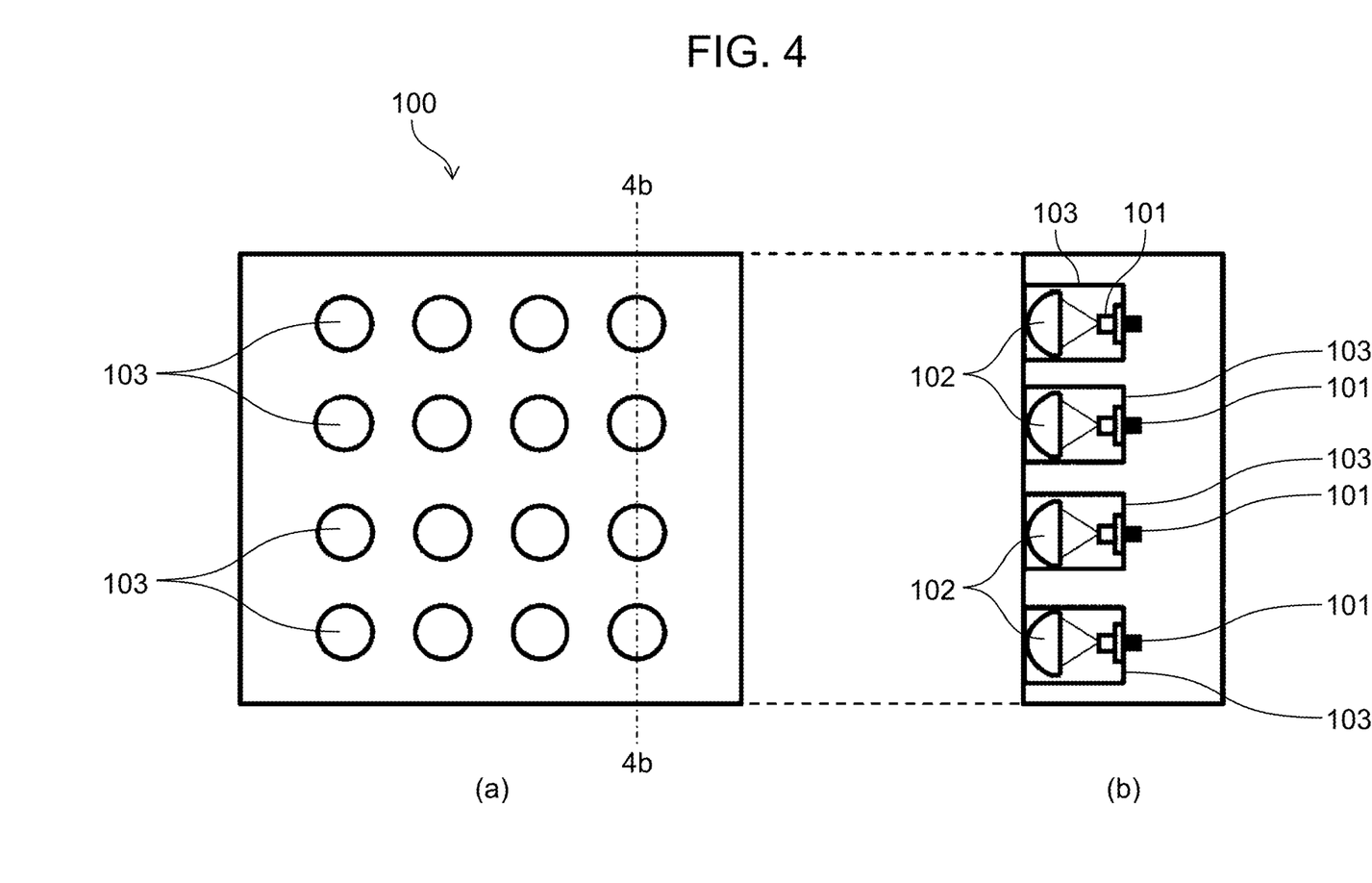
FIG. 4 is a diagram illustrating a configuration of a light source unit according to the first exemplary embodiment.

FIG. 4 illustrates a configuration used for first light source unit 100A to third light source unit 100C. Since first light source unit 100A to third light source unit 100C have an identical configuration, the configuration is indicated as light source unit 100 in FIG. 4. Part (a) of FIG. 4 is a front view of light source unit 100, and part (b) of FIG. 4 is a sectional view at a cutting position indicated by cutting line 4b in part (a) of FIG. 4. In a light emission surface of light source unit 100, a plurality of light source elements 101 are arranged in an array with a predetermined pitch. In the present exemplary embodiment, light source elements 101 are arranged in a matrix of 4×4. A semiconductor laser is used for light source element 101, for example. Light emitted from each light source element 101 is converted into substantially collimated light with collimate lens 102 to be emitted from light source unit 100. A portion on which light source element 101 and collimate lens 102 are disposed is referred to as light source element part 103. Each of arrows in FIG. 3 representatively indicates emitted light from one light source element among the plurality of light source elements provided in each of first light source unit 100A to third light source unit 100C.

First light source unit 100A and second light source unit 100B are disposed facing each other such that an optical axis of emitted light of each light source element coincides with each other while interposing polarization beam splitter (PBS) 110 between first light source unit 100A and second light source unit 100B, and first light source unit 100A and second light source unit 100B are disposed in the −X direction (corresponding to a first direction) and the +X direction (corresponding to a second direction), respectively. Third light source unit 100C is disposed in a −Z direction (corresponding to a third direction), and polarization conversion element 120 is disposed between polarization beam splitter 110 and third light source unit 100C. In this manner, third light source unit 100C is disposed such that light from third light source unit 100C is emitted along a direction perpendicular to directions of the light emitted from first light source unit 100A and second light source unit 100B.

Light source elements 101 in first light source unit 100A and second light source unit 100B are disposed such that first light source unit 100A and second light source unit 100B emit light of S polarization that is first linear polarization light to be reflected by polarization beam splitter 110. Light source elements 101 in third light source unit 100C are disposed such that third light source unit 100C emits light of P polarization that is second linear polarization light of which polarization direction is perpendicular to the first linear polarization light, which transmits through polarization beam splitter 110.

With respect to a polarization direction of light emitted from each light source unit, first light source unit 100A and second light source unit 100B are parallel to the Y direction, and third light source unit 100C is disposed parallel to the X direction.

Figure 5:
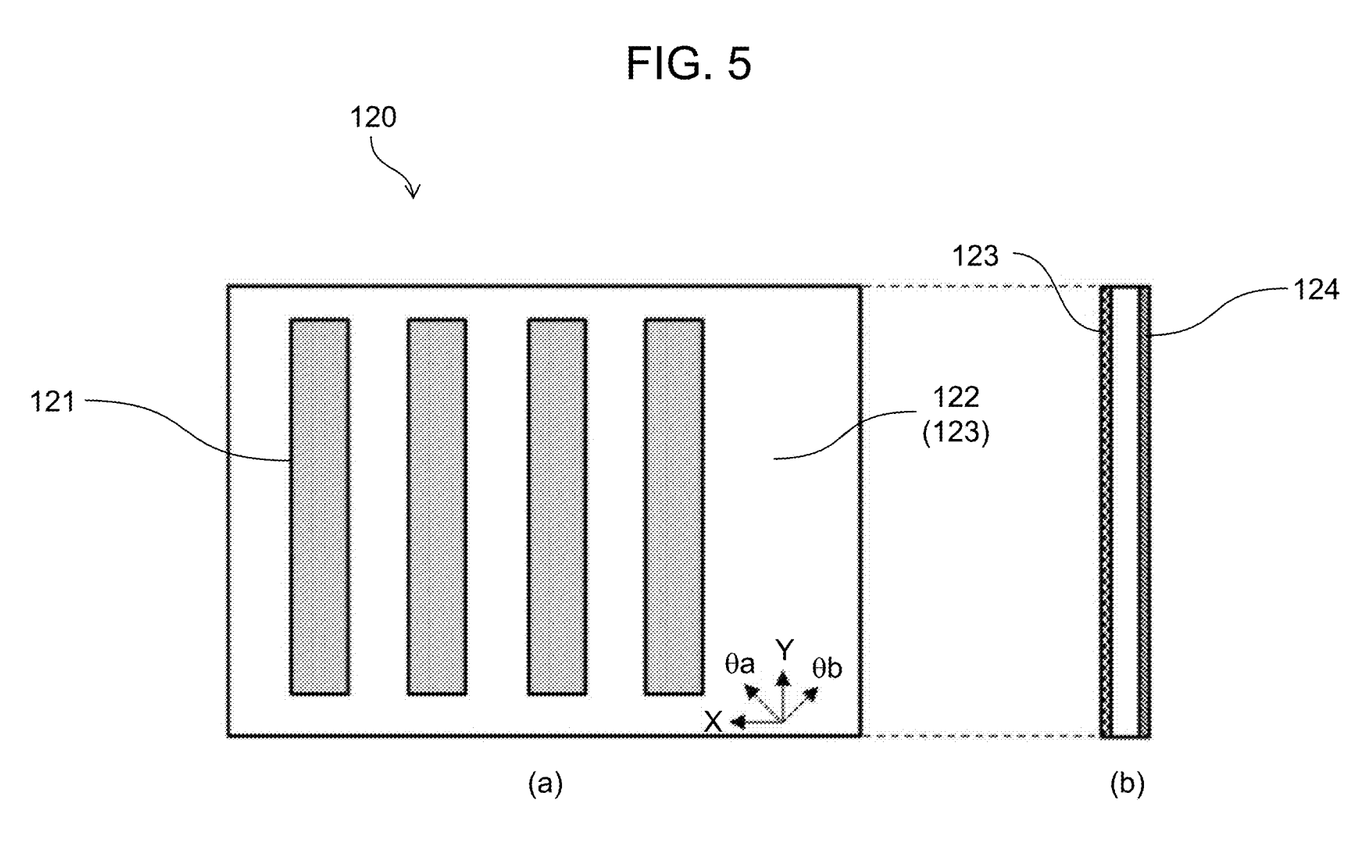
FIG. 5 is a diagram illustrating a configuration of a polarization conversion element according to the first exemplary embodiment.

Polarization conversion element 120 is illustrated in detail in FIG. 5. As illustrated in a plan view in part (a) of FIG. 5, polarization conversion element 120 is divided into opening regions 121 (hatched regions) formed on a transparent glass substrate and non-opening region 122. As illustrated in a side view in part (b) of FIG. 5, one surface 123 of non-opening region 122 is applied with a ¼(quarter) wavelength coat and another surface 124 is applied with a reflective coat as a mirror surface. The ¼ wavelength coat serves to shift phases of two polarization components perpendicular to each other, and its slow axis is disposed parallel to a θa direction rotated from the Y direction by 45 degrees. Further, a θb direction illustrated in part (a) of FIG. 5 indicates a direction of a fast axis. Polarization conversion element 120 is disposed such that surface 123 applied with the ¼ wavelength coat faces polarization beam splitter 110, and surface 124 applied with the reflective coat faces third light source unit 100C.

[1-2. Operation of Light Source Device]

Hereinafter, a polarization direction to be reflected by polarization beam splitter 110 is defined as an S direction, and a polarization direction to transmit through polarization beam splitter 110 is defined as a P direction. Linearly polarization light vibrating along the S direction is referred to as S polarization light, and linearly polarization light vibrating along the P direction is referred to as P polarization light.

Since light flux LA emitted from first light source unit 100A includes the S polarization light, light flux LA is reflected by polarization beam splitter 110 in the −Z direction. Since light flux LC emitted from third light source unit 100C passes through opening regions 121 of polarization conversion element 120 and includes the P polarization light, light flux LC transmits through polarization beam splitter 110 and advances in the −Z direction. Since light flux LB emitted from second light source unit 100B includes the S polarization light, light flux LB is reflected by polarization beam splitter 110 in the +Z direction (corresponding to a fourth direction) and enters non-opening region 122 of polarization conversion element 120. Light flux LB having entered non-opening region 122 becomes circularly polarization light when transmitting through surface 123, and after being reflected by surface 124, light flux LB becomes the P polarization light when transmitting through surface 123 again. Light flux LB then transmits through polarization beam splitter 110 and advances in the −Z direction.

Figure 6:
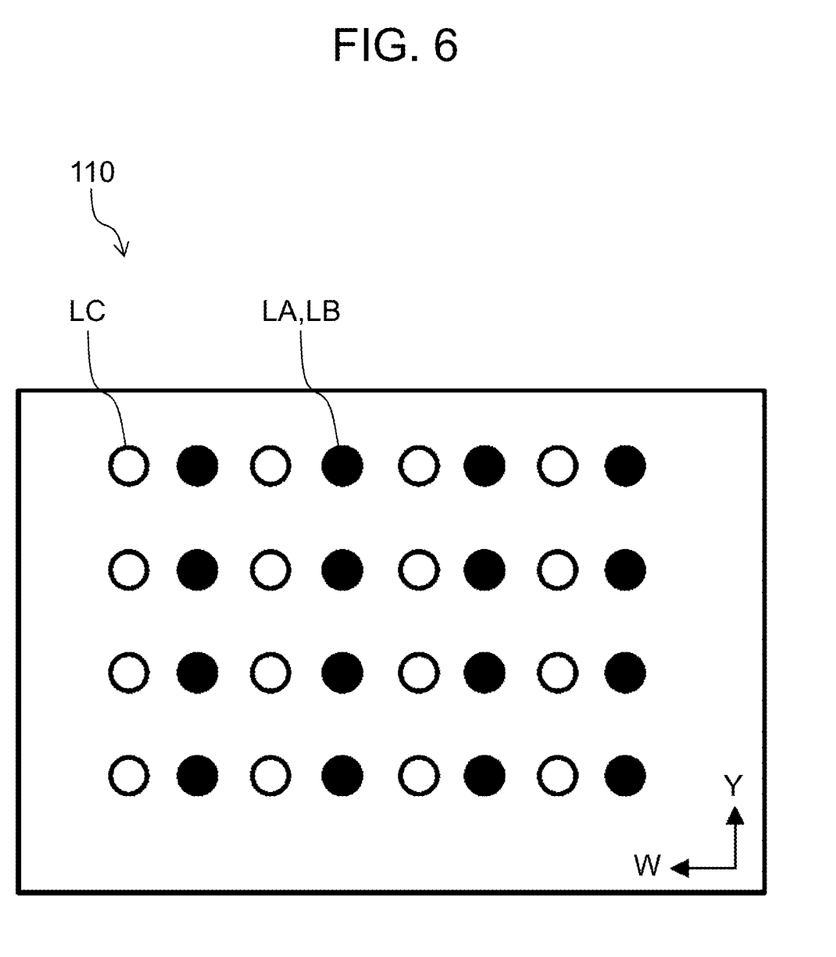
FIG. 6 is a diagram illustrating light ray transmissive regions on a polarization beam splitter according to the first exemplary embodiment.

FIG. 6 illustrates transmissive regions of light fluxes LA, LB, and LC on polarization beam splitter 110. Light fluxes LA and LB are reflected at identical transmissive regions (regions indicated by black circles in FIG. 6) or transmit through those regions. Light flux LC transmits through regions between the transmissive regions of light fluxes LA and LB (regions indicated by white circles in FIG. 6).

[1-3. Effects and Others]

As described above, in the present exemplary embodiment, since light fluxes LA and LB are overlapped with each other, and light flux LC falls into gaps between light fluxes LA and LB, all fluxes emitted from light source device 11 are small in light flux diameter. Illumination optical system 20 is therefore reduced in size, whereby projector 1 can be miniaturized. Furthermore, since the light source unit combines light fluxes from three directions, the light source unit can be made smaller than the conventional configuration that combines light fluxes from two directions.

Second Exemplary Embodiment

A second exemplary embodiment will now be described with reference to FIGS. 7 to 9. In the second exemplary embodiment, components identical to components of the first exemplary embodiment are denoted by the same numerals or symbols, and duplicated descriptions thereof are omitted.

Figure 7:
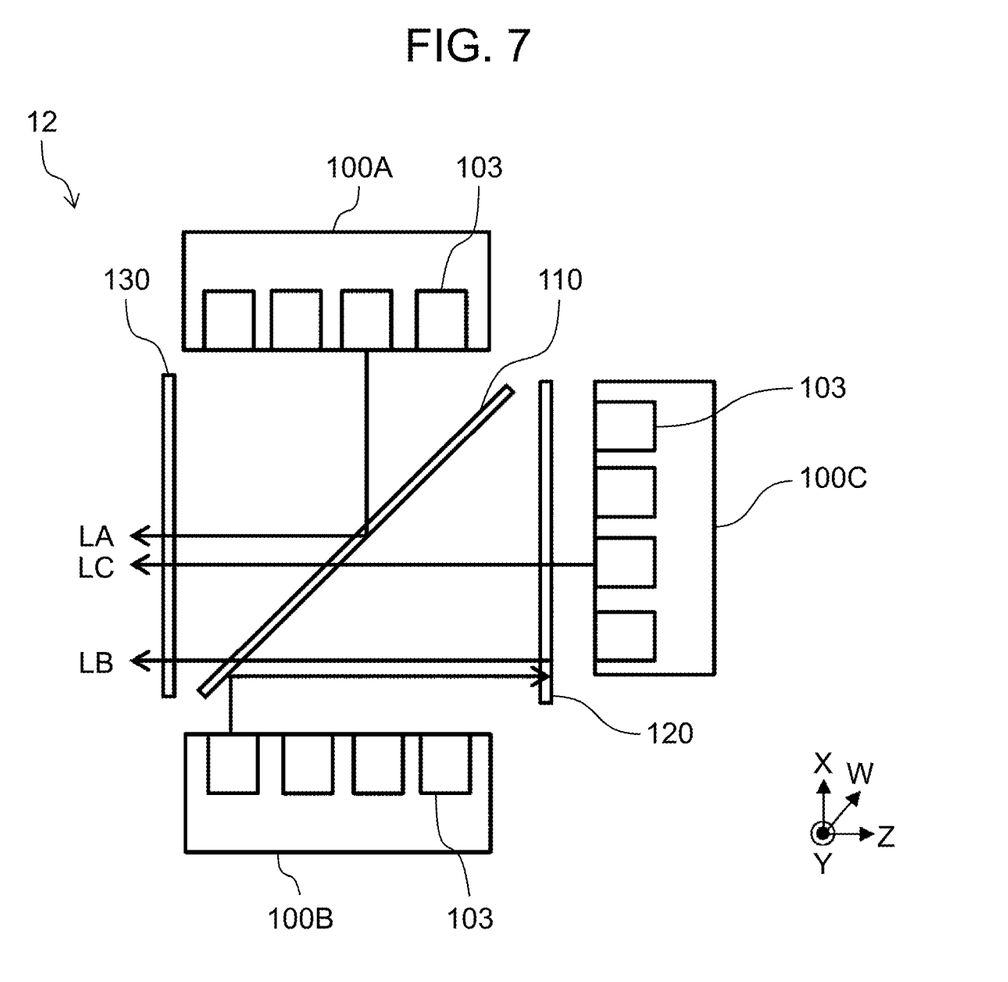
FIG. 7 is a diagram illustrating a configuration of a light source device according to a second exemplary embodiment.

FIG. 7 illustrates a configuration of light source device 12 according to the second exemplary embodiment. Light source device 12 is different from light source device 11 according to the first exemplary embodiment in that first light source unit 100A and second light source unit 100B face each other in the X direction while interposing polarization beam splitter 110 between first light source unit 100A and second light source unit 100B, and first light source unit 100A and second light source unit 100B are shifted from each other by a half pitch of the light source elements in the Y direction. Further, retardation plate 130 is disposed near an emission port of light source device 12.

Figure 8:
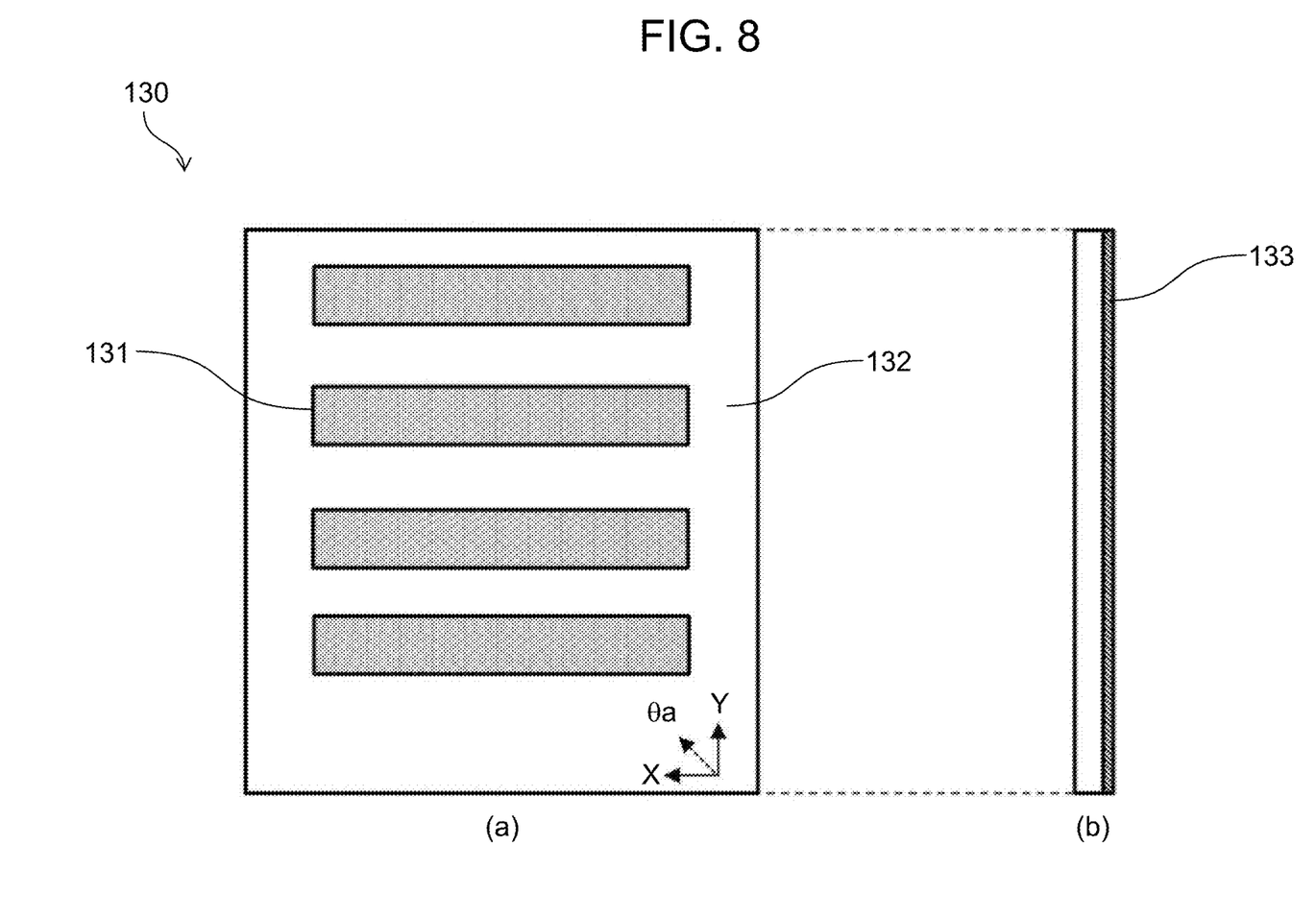
FIG. 8 is a diagram illustrating a configuration of a retardation plate according to the second exemplary embodiment.
Figure 9:
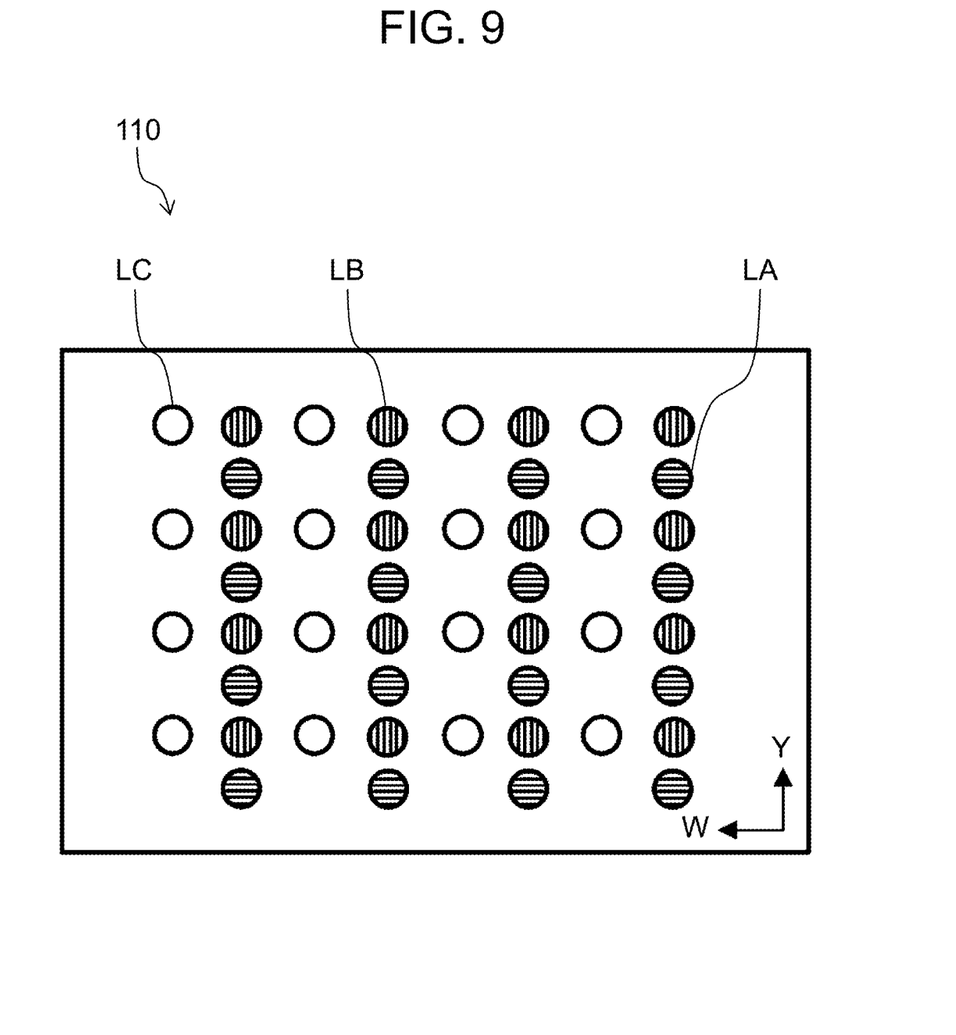
FIG. 9 is a diagram illustrating light ray transmissive regions on a polarization beam splitter according to the second exemplary embodiment.

FIG. 8 illustrates a configuration of retardation plate 130. Part (a) of FIG. 8 is a front view, and part (b) of FIG. 8 is a side view. Retardation plate 130 includes opening regions 131 (hatched regions) formed on a transparent glass substrate and non-opening region 132. Surface 133 of non-opening region 132 is applied with a ½(half) wavelength coat, and its slow axis is set parallel to a θa direction rotated from the Y direction by 45 degrees. Surface 133 is disposed so as to face third light source unit 100C.

With reference back to FIG. 7 again, an operation of light source device 12 will be described. Light flux LA of the S polarization emitted from first light source unit 100A is reflected by polarization beam splitter 110 in the −Z direction, and enters non-opening region 132 of retardation plate 130. At this time, a polarization direction of light flux LA is converted from the S polarization to the P polarization, and advances in the −Z direction. Light flux LC of the P polarization emitted from third light source unit 100C passes through opening regions 121 of polarization conversion element 120, transmits through polarization beam splitter 110, passes through opening regions 131 of retardation plate 130, and advances in the −Z direction. Light flux LB of the S polarization emitted from second light source unit 100B is reflected by polarization beam splitter 110 in the +Z direction, is converted to the P polarization by polarization conversion element 120, and is reflected in the −Z direction. Light flux LB then transmits through polarization beam splitter 110, passes through opening regions 131 of retardation plate 130, and advances in the −Z direction. FIG. 9 illustrates transmissive regions of the light fluxes on polarization beam splitter 110. In the present exemplary embodiment, light flux LA (circles with lateral stripe), light flux LB (circles with longitudinal stripe), and light flux LC (white circles) pass through different regions on polarization beam splitter 110.

As described above, light source device 12 according to the second exemplary embodiment can further make the polarization directions of light fluxes LA, LB, and LC uniform, while obtaining the advantage of miniaturization similar to light source device 11 according to the first exemplary embodiment. Light source 12 can be employed as a light source device of projector 1.

Third Exemplary Embodiment

Figure 10:
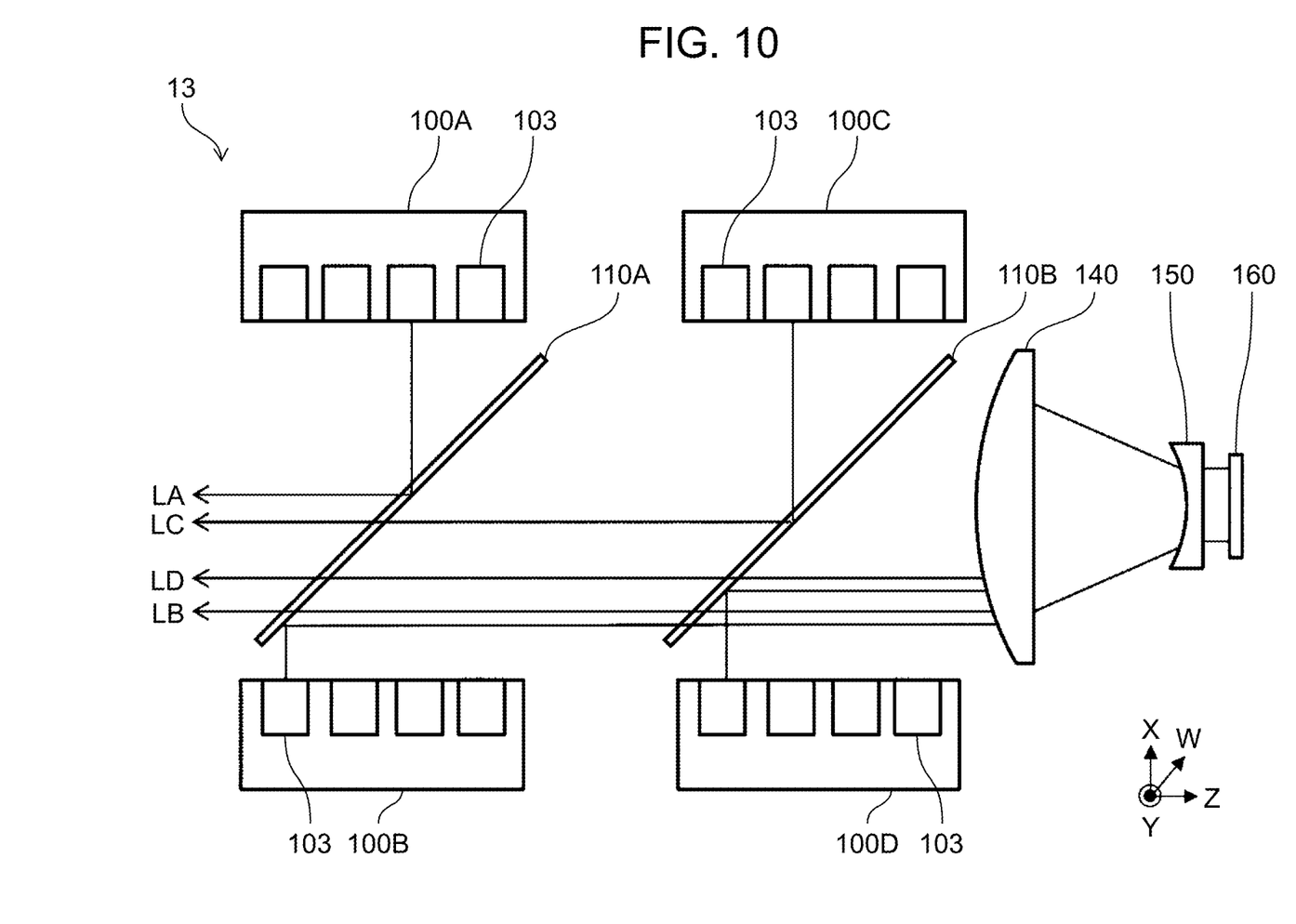
FIG. 10 is a diagram illustrating a configuration of a light source device according to a third exemplary embodiment.

Hereinafter, a third exemplary embodiment will be described with reference to FIGS. 10 to 12. FIG. 10 illustrates a configuration of light source device 13 according to the third exemplary embodiment. Light source device 13 is configured with first light source unit 100A, second light source unit 100B, third light source unit 100C, fourth light source unit 100D, first polarization beam splitter 110A, second polarization beam splitter 110B, collimate lenses 140 and 150, and polarization conversion element 160.

A structure of each of first light source unit 100A to fourth light source unit 100D is the same as that of light source unit 100 illustrated in FIG. 4. First light source unit 100A and second light source unit 100B are disposed facing each other such that first polarization beam splitter 110A is disposed between first light source unit 100A and second light source unit 100B, and an optical axis of light emitted from each light source element in the X direction coincides with each other. Third light source unit 100C and fourth light source unit 100D are disposed facing each other such that second polarization beam splitter 110B is disposed between third light source unit 100C and fourth light source unit 100D, and an optical axis of light emitted from each light source element in the X direction coincides with each other.

Note that, first light source unit 100A to fourth light source unit 100D are disposed such that light emitted from each of these light source units includes the S polarization light with respect to corresponding polarization beam splitter.

Figure 11:
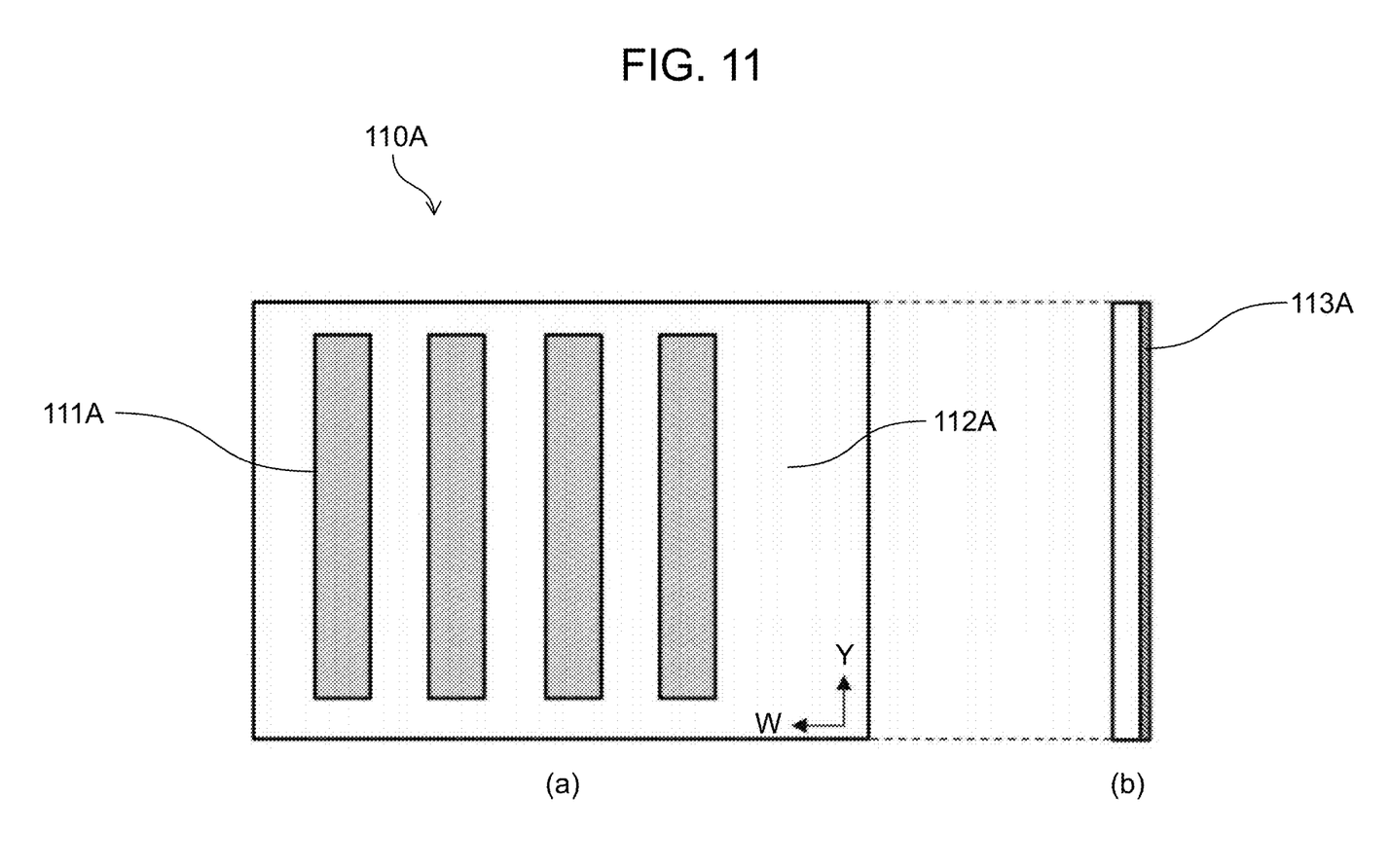
FIG. 11 is a diagram illustrating a configuration of a polarization beam splitter according to the third exemplary embodiment.

FIG. 11 illustrates a configuration of first polarization beam splitter 110A. Part (a) of FIG. 11 is a front view, and part (b) of FIG. 11 is a side view. First polarization beam splitter 110A is configured with opening regions 111A (corresponding to first openings for light transmission) and non-opening region 112A. One surface 113A of non-opening region 112A is applied with a beam splitter coat that reflects S polarization light and transmits P polarization light. Second polarization beam splitter 110B (not illustrated) is also configured with opening regions (corresponding to second openings for light transmission) and a non-opening region. One surface of the non-opening region is also applied with a beam splitter coat that reflects the S polarization light and transmits the P polarization light. When viewed being projected in the Z direction, the opening regions and the non-opening region of second polarization beam splitter 110B are disposed while being shifted along a W direction so as not to overlap the opening regions and the non-opening region of first polarization beam splitter 110A. For each of first polarization beam splitter 110A and second polarization beam splitter 110B, the one surface applied with the beam splitter coat is directed in collimate lens 140.

Polarization conversion element 160 is configured with a transparent substrate having a surface facing collimate lens 150 applied with the ¼ wavelength coat and an opposite surface applied with the reflective coat.

With reference back to FIG. 10 again, an operation of light source device 13 will be described. Light flux LA of the S polarization emitted from first light source unit 100A is reflected by non-opening region 112A of first polarization beam splitter 110A in the −Z direction. Light flux LC of the S polarization emitted from third light source unit 100C is reflected by the non-opening region of second polarization beam splitter 110B, passes through opening regions 111A of first polarization beam splitter 110A, and advances in the −Z direction.

Light flux LD of the S polarization emitted from fourth light source unit 100D is reflected by the non-opening region of second polarization beam splitter 110B in the +Z direction. A light flux diameter of light flux LD is reduced by collimate lenses 140 and 150. Light flux LD enters polarization conversion element 160, and is converted to the P polarization by polarization conversion element 160. Light flux LD converted to the P polarization enters collimate lenses 140 and 150 again, and its light flux diameter is increased. Light flux LD then transmits through the non-opening region of second polarization beam splitter 110B, passes through opening regions 111A of first polarization beam splitter 110A, and advances in the −Z direction.

Light flux LB of the S polarization emitted from second light source unit 100B is reflected by non-opening region 112A of first polarization beam splitter 110A in the +Z direction, passes through the opening regions of second polarization beam splitter 110B, and enters collimate lens 140. After converted to the P polarization similar to light flux LD, light flux LB then passes through the opening regions of second polarization beam splitter 110B, transmits through non-opening region 112A of first polarization beam splitter 110A, and advances in the −Z direction.

Figure 12:
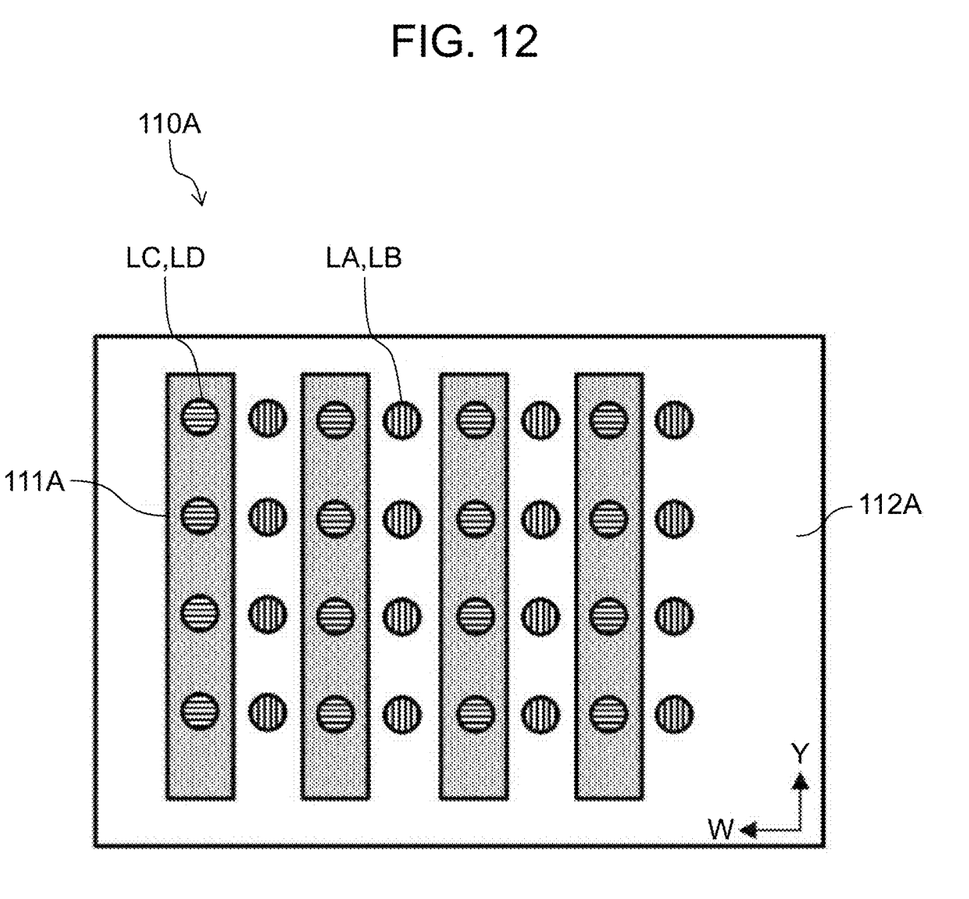
FIG. 12 is a diagram illustrating light ray transmissive regions on the polarization beam splitter according to the third exemplary embodiment.

FIG. 12 illustrates transmissive regions of light fluxes LA to LD on first polarization beam splitter 110A. Light fluxes LA and LB are reflected by non-opening region 112A or transmit through non-opening region 112A. Light fluxes LC and LD pass through opening regions 111A.

With the above configuration, in light source device 13 of the third exemplary embodiment, polarization conversion element 160 is made smaller than that in the light source device of the first or second exemplary embodiment. Accordingly, the cost can be reduced. Light source device 13 can be employed as a light source device of projector 1.

Other Exemplary Embodiments

The first to third exemplary embodiments have been described above to exemplify the technique disclosed in the present application. However, the technique of the present disclosure is not limited to the first to third exemplary embodiments, and also applicable to other exemplary embodiments that undergo some modifications, replacements, additions, and omissions, for example, as appropriate. Novel exemplary embodiments can also be made by a combination of the components of the first to third exemplary embodiments. Some other exemplary embodiments will be described below as examples.

(1) In the first exemplary embodiment, light source device 11 including three light source units 100A to 100C, polarization beam splitter 110, and polarization conversion element 120 has been described. The present disclosure is not limited to this configuration, and is applicable to a form including n light source units and (n−1) light ray composition plates. Herein, n is an integer of three or more.

(2) Furthermore, the polarization conversion element of the first to third exemplary embodiments may have a configuration in which a retardation film is bonded to a glass plate.

(3) The light source unit of each of the first to third exemplary embodiments employs the configuration in which 16 light sources in total are arranged in the matrix of 4 rows and 4 columns, but a number of light sources and arrangement are not limited thereto.

(4) In the first and second exemplary embodiments, the light source device including three light source units 100A to 100C has been described. The present disclosure is not limited this configuration, and the light source device may be configured with two light source units 100A and 100B. In other words, third light source unit 100C can be omitted in light source devices 11 and 12. In this case, opening regions 121 of polarization conversion element 120 can also be omitted.

(5) In the third exemplary embodiment, light source device 13 including four light source units 100A to 100D and two polarization beam splitters 110A and 110B has been described. The present disclosure is not limited this configuration, and by further employing four light source units and two polarization beam splitters having similar configurations, the light source device can be configured with eight light source units and four polarization beam splitters in total. In other words, four light source units and two polarization beam splitters that are newly added are disposed on the −Z direction side of light source device 13 of the third exemplary embodiment. In this case, an optical axis of each light source element of four light source units thus added is disposed so as to be shifted with respect to four light source units 100A to 100D along the Y direction by a half pitch. In addition, openings through which light fluxes from four light source units 100A to 100D pass may be provided in two polarization beam splitters thus added, and openings through which light fluxes from the added light source units pass may be provided in two polarization beam splitters 110A and 110B.

The exemplary embodiments have been described above as examples of the technique in the present disclosure. For that purpose, the accompanying drawings and the detailed description have been provided.

The components illustrated in the accompanying drawings and described in the detailed description can include components essential for solving the problems, as well as components that are not essential for solving the problems but required to describe the above technique as an example. Therefore, it should not be immediately construed that these components that are not essential are essential even if the components are described in the accompanying drawings and the detailed description.

Since the above-described exemplary embodiments are for exemplifying the technique of the present disclosure, various modifications, replacements, additions, and omissions can be made within the scope of the claims or their equivalents.

The present disclosure is applicable to a light source device that combines and uses light from a plurality of light sources, and a projection display apparatus using this light source device.

What is claimed is:

1. A light source device comprising:
    a first light source unit that emits first linear polarization light in a first direction;
    a second light source unit that is disposed facing the first light source unit, and emits the first linear polarization light in a second direction opposite to the first direction;
    a first polarization beam splitter that is disposed between the first light source unit and the second light source unit, reflects the first linear polarization light, and transmits second linear polarization light of which polarization direction is perpendicular to the first linear polarization light; and
    a polarization conversion element configured with a transparent substrate having one surface with a ¼ wavelength coat and another surface with a reflective coat,
    wherein the first linear polarization light emitted from the first light source unit is reflected by the first polarization beam splitter in a third direction perpendicular to the first and second directions, and
    the first linear polarization light emitted from the second light source unit is reflected by the first polarization beam splitter in a fourth direction opposite to the third direction, is converted into the second linear polarization light by the polarization conversion element, and is reflected in the third direction.

2. The light source device according to claim 1, further comprising a third light source unit that emits the second linear polarization light in the third direction,
    wherein the first polarization beam splitter includes an opening through which the second linear polarization light from the third light source unit passes.

3. The light source device according to claim 1, further comprising a retardation plate that is disposed at an emission port of the light source device, the retardation plate being configured with a transparent substrate having an opening through which the second linear polarization light passes and one surface with a ½ wavelength coat.

4. The light source device according to claim 1, further comprising:
    a third light source unit that emits the first linear polarization light in the first direction;
    a fourth light source unit that is disposed facing the third light source unit, and emits the first linear polarization light in the second direction; and
    a second polarization beam splitter that is disposed between the third light source unit and the fourth light source unit, includes a second opening for light transmission, reflects the first linear polarization light, and transmits the second linear polarization light,
    wherein the first polarization beam splitter includes a first opening for light transmission, the first linear polarization light emitted from the second light source unit is reflected by the first polarization beam splitter in the fourth direction, passes through the second opening of the second polarization beam splitter, is converted into the second linear polarization light by the polarization conversion element, and is reflected in the third direction, the first linear polarization light emitted from the third light source unit is reflected by the second polarization beam splitter in the third direction, and passes through the first opening of the first polarization beam splitter, and the first linear polarization light emitted from the fourth light source unit is reflected by the second polarization beam splitter in the fourth direction, is converted into the second linear polarization light by the polarization conversion element, and is reflected in the third direction.

5. A projection display apparatus comprising the light source device according to claim 1.

\* \* \* \* \*